(12) United States Patent
Kim

(10) Patent No.: US 8,137,204 B2
(45) Date of Patent: Mar. 20, 2012

(54) TORQUE LIMITER

(75) Inventor: Hyun-soo Kim, Yongin-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 743 days.

(21) Appl. No.: 12/034,873

(22) Filed: Feb. 21, 2008

(65) Prior Publication Data

US 2008/0268964 A1 Oct. 30, 2008

(30) Foreign Application Priority Data

Apr. 24, 2007 (KR) ................ 10-2007-0040059

(51) Int. Cl.
*F16D 7/02* (2006.01)
(52) U.S. Cl. ............. 464/40; 464/57; 267/167
(58) Field of Classification Search ........... 464/40, 464/57–60, 160–161; 267/166, 167; 399/167; 192/41 R; 403/84, 103

See application file for complete search history.

(56) References Cited

U.S. PATENT DOCUMENTS

| | | | | |
|---|---|---|---|---|
| 22,852 A * | 2/1859 | Swift, Jr. | | 430/295 |
| 2,219,877 A * | 10/1940 | Starkey | | 192/35 |
| 2,475,432 A * | 7/1949 | Marihart | | 192/33 C |
| 2,510,644 A * | 6/1950 | McCormick | | 464/23 |
| 3,111,822 A * | 11/1963 | Hansen | | 464/40 |
| 3,220,523 A * | 11/1965 | Hepner | | 192/81 R |
| 4,030,412 A * | 6/1977 | Springer | | 101/132 |

FOREIGN PATENT DOCUMENTS

JP 11190368 A * 7/1999

* cited by examiner

*Primary Examiner* — James Hewitt
*Assistant Examiner* — Jay R Ripley
(74) *Attorney, Agent, or Firm* — Stanzione & Kim, LLP

(57) ABSTRACT

A torque limiter includes a driving bushing, a clutch spring wound around an outer circumference of the driving bushing, and a housing receiving a driving force via the clutch spring. The housing includes a first catch portion engaged with a first end portion of the clutch spring, and a second catch portion engaged with a second end portion of the clutch spring. The second catch portion is movable with respect to the first catch portion to change an angle between the first and second end portions of the clutch spring.

16 Claims, 8 Drawing Sheets

TORQUE LIMITER

CROSS-REFERENCE TO RELATED APPLICATIONS

This application claims the benefit of Korean Patent Application No. 10-2007-0040059, filed on Apr. 24, 2007, in the Korean Intellectual Property Office, the disclosure of which is incorporated herein in its entirety by reference.

BACKGROUND OF THE INVENTION

1. Field of the Invention

The present general inventive concept relates to a torque limiter, and particularly, to a torque limiter including a clutch spring.

2. Description of the Related Art

A torque limiter is a device that decouples a driving force of a driving unit from a driven unit when a load by the driven unit exceeds a preset range. A torque limiter including a clutch spring has a simple structure, and, thus, the torque limiter is widely used in, for example, cars, electronic products, printers, and duplicators. For example, in a paper feeder for a printer, a torque limiter including a clutch spring is utilized in a power transfer unit for a reverse roller in a paper separator that separates paper sheet by sheet.

FIGS. 1 and 2 illustrate an example of a conventional torque limiter including a clutch spring. Referring to FIGS. 1 and 2, a clutch spring 30 is coupled to a hub 20 receiving a driving force from a driving source (not illustrated). The clutch spring 30 applies a predetermined torque to an outer circumstance of a hub 20. A driven body (not illustrated) is connected to a housing 10. The housing 10 includes catch portions 11 and 12 that are engaged with end portions 31 and 32 of the clutch spring 30. When the hub 20 coupled with the clutch spring 30 is inserted in the housing 10, both end portions 31 and 32 of the clutch spring 30 are engaged with the catch portions 11 and 12, respectively. Thereafter, a cap 40 is coupled to the housing 10. If clearances exist between the end portions 31 and 32 of the clutch spring 30 and the catch portions 11 and 12, an assembly process may be facilitated, but the torque limiting operation of the torque limiter is delayed by a time period corresponding to the distance that must be traversed by the housing to engage with the clutch spring 30. To operate the torque limiter without backlash, there must be no clearances between the catch portions 11 and 12 and the end portions 31 and 32 of the clutch spring 30. Thus, an interval between the catch portions 11 and 12 must be greater than that between the end portions 31 and 32 of the clutch spring 30. In this case, when the hub 20 coupled with the clutch spring 30 is assembled into the housing 10, the end portions 31 and 32 of the clutch spring 30 must be spread out so as to be engaged with the catch portions 11 and 12, which makes the assembly process very inconvenient.

Because a threshold torque of the torque limiter is dependent upon a coupling force between the clutch spring 30 and the hub 20, the threshold torque is affected by manufacturing tolerances of the clutch spring 30 and the hub 20. The torque limiter having the structure illustrated in FIGS. 1 and 2 does not include a structure for compensating for the manufacturing tolerances of the clutch spring 30 or the hub 20. Thus, the manufacturing tolerances of the clutch spring 30 or the hub 20 affect the threshold torque.

SUMMARY OF THE INVENTION

The present general inventive concept provides a torque limiter that can be assembled simply and can be adjusted to a selected threshold torque.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a torque limiter including a driving bushing; a clutch spring wound around an outer circumference of the driving bushing, and a housing receiving a driving force via the clutch spring, wherein the housing includes a first catch portion engaged with a first end portion of the clutch spring, a second catch portion engaged with a second end portion of the clutch spring, the second catch portion moveable with respect to the first catch portion to change an angle between the first and second end portions and a locking portion locking the second catch portion in one of a plurality of positions.

The second catch portion may be rotated with respect to the first catch portion.

One of the plurality of positions may allow the second catch portion to be placed between the first and second end portions of the clutch spring while the clutch spring is in a relaxed state.

The foregoing and/or other aspects and utilities of the present general inventive concept may also be achieved by providing a torque limiter including a driving bushing, a clutch spring wound around an outer circumference of the driving bushing; and a housing receiving a driving force via the clutch spring and including a first housing and a second housing coupled to be movable with respect to each other, and a locking portion locking the second housing in a plurality of positions, wherein the first housing includes a first catch portion engaged with a first end portion of the clutch spring, and the second housing includes a second catch portion engaged with a second end portion of the clutch spring, so that an angle between the first and second end portions of the clutch spring can be changed.

The first housing may further include a lower housing including the first catch portion, and an upper housing coupled with the lower housing, and the second housing may be coupled rotatably to the upper housing.

The locking portion may include an adjustment arm provided at the second housing; and a plurality of mounting portions provided in the upper housing and receiving the adjustment arm.

One of the plurality of mounting portions may allow the second catch portion to be placed between the first and second end portions of the clutch spring.

The foregoing and/or other aspects and utilities of the present general inventive concept may also be achieved by providing a torque limiter including a drive member to receive torque about a rotational axis thereof, a clutch member frictionally coupled to the drive member by an amount of friction proportional to a spread distance between a first end portion and a second end portion thereof, and a housing coupled to the clutch member through a first catch portion and a second catch portion thereof respectively engaging the first end portion and the second end portion of the clutch member, the first catch portion and the second catch portion being displaceable respective one another to establish a selected spread distance between the first end portion and the second end portion of the clutch member and subsequently locked in a relative position respective one another.

The foregoing and/or other aspects and utilities of the present general inventive concept may also be achieved by providing a torque limiter including a cylindrical drive member to receive torque about a rotational axis thereof, a clutch member frictionally coupled to an outer periphery of the drive member by an amount of friction proportional to a spread distance between a first end portion and a second end portion thereof, a cylindrical housing having a longitudinal dimension parallel to the rotational axis and a radial dimension, the housing being coupled to the clutch member through a first catch portion and a second catch portion thereof respectively engaging the first end portion and the second end portion of the clutch member, the first catch portion and the second catch portion being displaceable respective one another to establish a selected spread distance between the first end portion and the second end portion of the clutch member and subsequently locked in a relative position respective one another.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
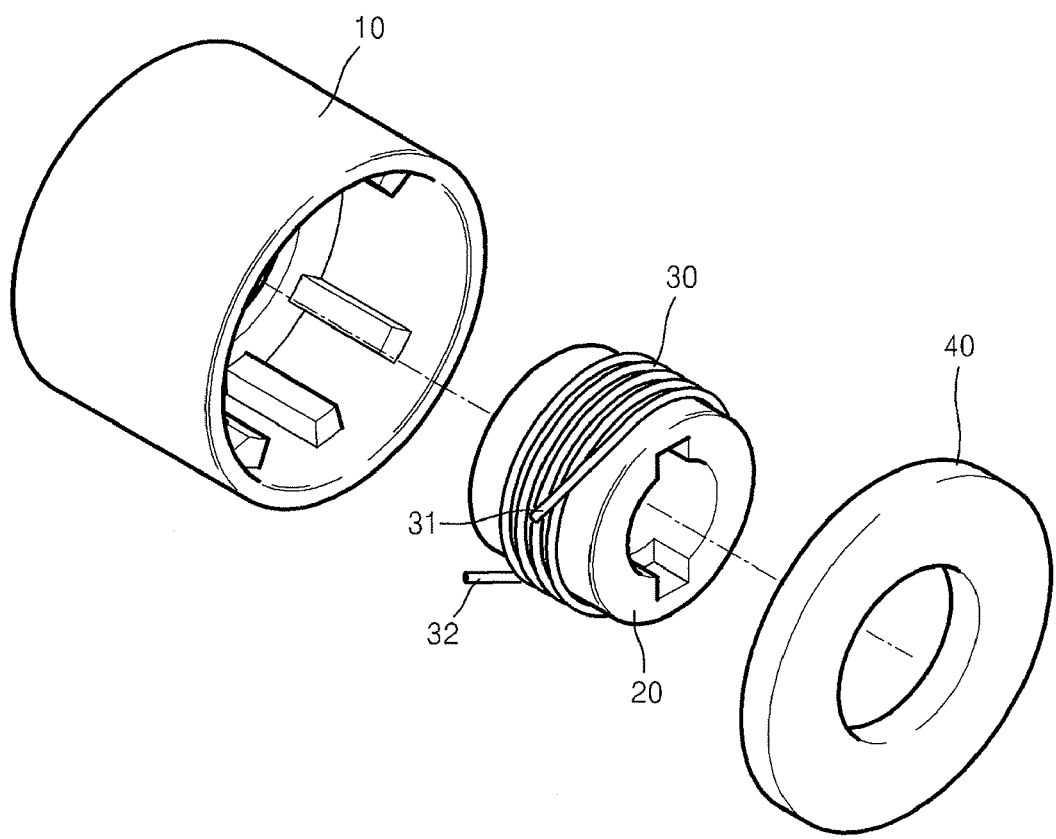
FIG. 1 is an exploded perspective view illustrating an example of a conventional torque limiter.
Figure 2:
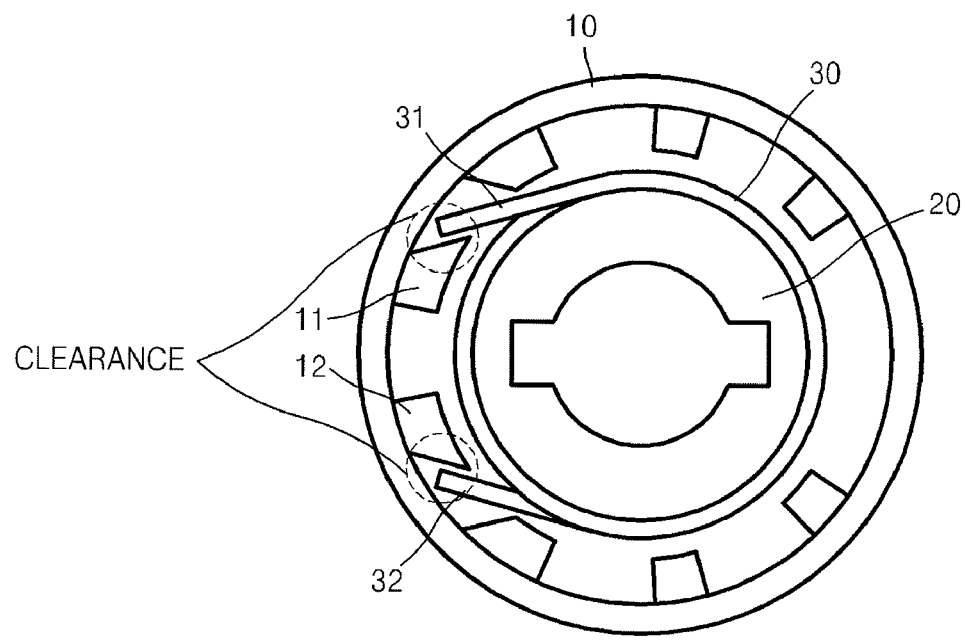
FIG. 2 is a cross-sectional view of FIG. 1.

Hereinafter, preferred embodiments of the present general inventive concept will be described in detail with reference to accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
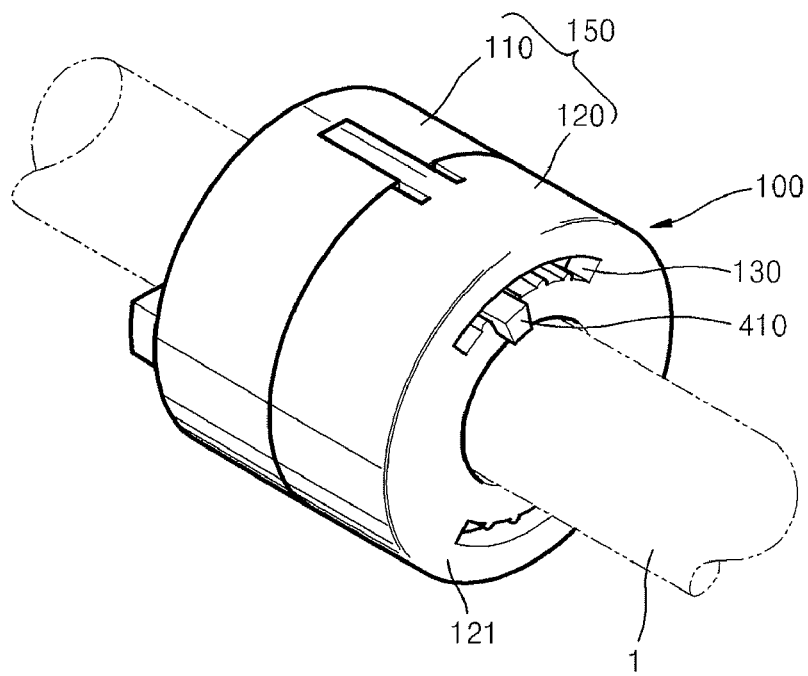
FIG. 3 is a perspective view of a torque limiter according to an embodiment of the present general inventive concept.
Figure 4:
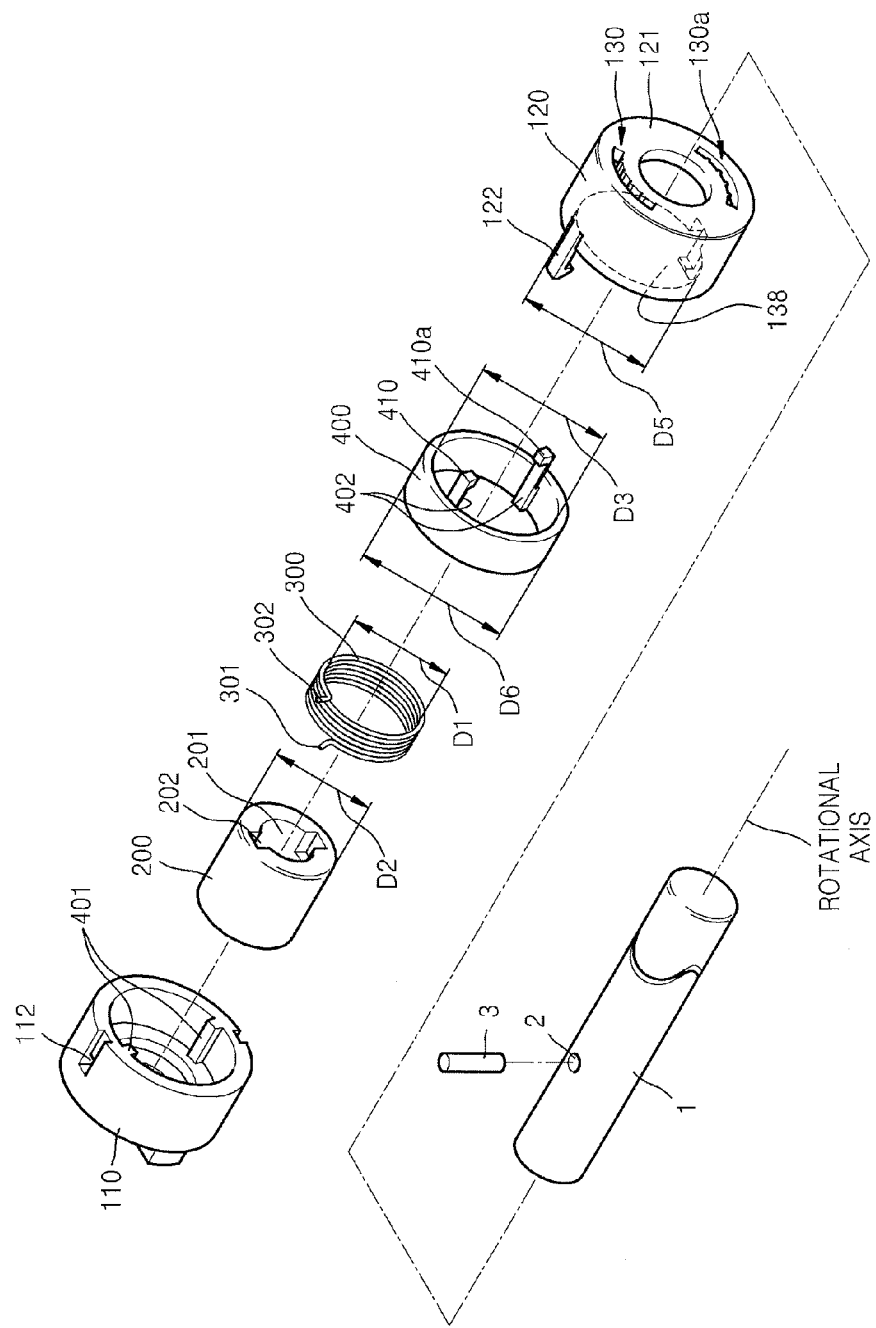
FIG. 4 is an exploded perspective view of the torque limiter of FIG. 3 according to an embodiment of the present general inventive concept.

FIG. 3 is a perspective view of a torque limiter according to an embodiment of the present general inventive concept, and FIG. 4 is an exploded perspective view of the torque limiter of FIG. 3 according to an embodiment of the present general inventive concept. It is to be understood that while a cylindrical embodiment is illustrated and described below, other geometries may be realized without departing from the spirit and intended scope of the present general inventive concept. For example, the embodiment illustrated in FIGS. 3 and 4 is larger in its longitudinal dimension parallel to the rotational axis than in its radial dimension, however the present general inventive concept may be embodied where the radial dimension is greater than the longitudinal dimension. Other geometries are also possible, as will be apparent to the skilled artisan upon review of this disclosure, and such geometries are intended to fall within the intended scope of the present general inventive concept.

Referring to FIGS. 3 and 4, a exemplary driving bushing 200 is connected to a driving source (not illustrated). A shaft 1 that may be rotated by the driving source (not illustrated) about a rotational axis and may be inserted in an insertion hole 201 of the driving bushing 200. The insertion hole 201 includes a coupling as a power-connection, such as the groove 202, between the shaft 1 and the driving bushing 20. A complementary power-connection, such as a pin 3 inserted into a through hole 2, is provided on the shaft 1. In the exemplary coupling arrangement, the shaft 1 is coupled to the driving bushing 200 through the pin 3 placed in the groove 202, so that the driving bushing 200 is rotated by way of the shaft 1.

A clutch member may be frictionally coupled to an outer circumference of the driving bushing 200 to impose a predetermined threshold torque, and is rotated together with the driving bushing 200 under the condition that the threshold torque is not exceeded. The clutch member may be implemented by a clutch spring 300 having first and second end portions 301 and 302, respectively. It is to be understood that while the clutch spring 300 is illustrated as a coil spring, other devices to impose friction on the driving bushing 200 and to drive the housing 100 are possible without deviating from the spirit and intended scope of the present general inventive concept.

The housing 100 is coupled to the clutch spring 300 and receives a driving force from the driving bushing 200 through the frictional coupling of the clutch spring 300 with the driving bushing 200. A driven body (not illustrated) may be connected to the housing 100. The housing 100 includes first and second catch portions 401 and 402 that are respectively engaged with first and second end portions 301 and 302.

The torque limiter according to the current embodiment may be adjusted to a selected threshold torque by increasing or decreasing the friction on the driving bushing 200 by the clutch spring 300. The threshold torque of the clutch spring 300 can be adjusted by changing an angle, or a spread distance, between the first and second end portions 301 and 302. To achieve the spread distance in the exemplary embodiment, the second catch portion 402 can be moved with respect to the first catch portion 401 to adjust the threshold torque of the clutch spring 300. The torque limiter according to the current embodiment of the present general inventive concept further includes a locking portion for locking the second catch portion 402 in a selected one of a plurality of positions.

Referring to FIGS. 3 and 4, the housing 100 may include a first housing 150 and a second housing 400 that can be moved relative to the first housing 150. The first housing 150 includes the first catch portion 401, and the second housing 400 includes the second catch portion 402. According to the current embodiment, as the second housing 400 is rotated with respect to the first housing 150, the threshold torque of the clutch spring 300 is adjusted. According to the current embodiment, the first housing 150 is divided into a lower housing 110 and an upper housing 120, and the lower housing 110 includes the first catch portion 401. The upper housing 120 serves as a cap and is coupled to the lower housing 110. The upper housing 120 includes an elastic hook 122 as an example of a coupling unit for coupling the upper and lower housings 120 and 110 together. The lower housing 110 includes a complementary coupling portion 112, which is coupled with the elastic hook 122, and the upper housing 120 may include a mounting part 130 in which the adjustment arm 410 is inserted. The adjustment arm 410 may extend toward the upper housing 120.

Figure 5:
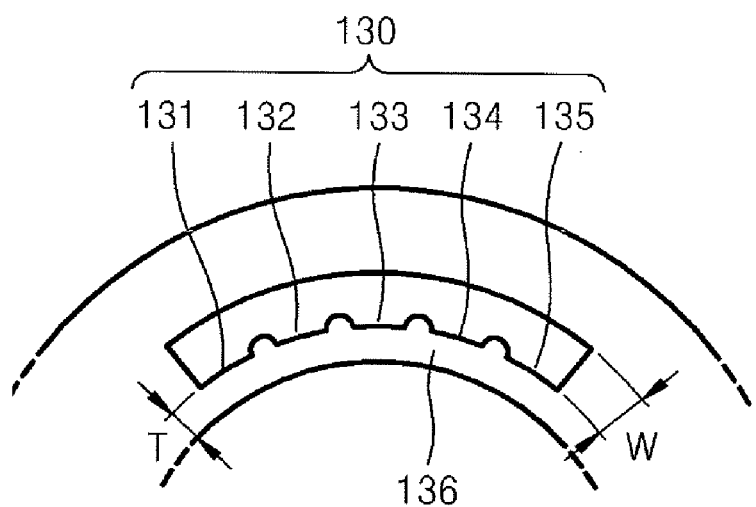
FIG. 5 is a detailed view of a mounting part of the torque limiter of FIG. 3 according to an embodiment of the present general inventive concept.
Figure 6:
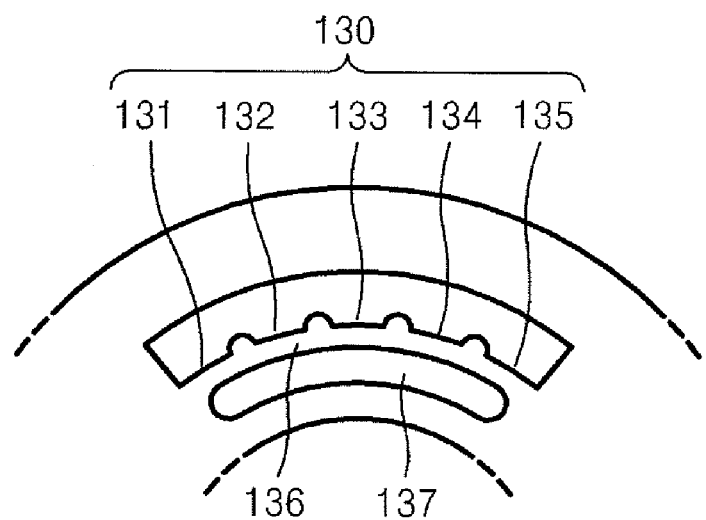
FIG. 6 is a detailed view illustrating a mounting part of the torque limiter of FIG. 3 according to another embodiment of the present general inventive concept.

FIG. 5 illustrates the mounting part 130 in detail according to an embodiment of the present general inventive concept. The adjustment arm 410 can be locked in a selected one of a plurality of positions of the mounting part 130, so that a threshold torque can be adjusted in steps. The mounting part 130 may be formed in an arc shape, but may be formed in other shapes in accordance with the particular geometry of the torque limiter implementation. An inner wall 136 of the mounting part 130 may be elastic so that the adjustment arm 410 can be locked in steps when the second housing 400 is rotated. If the upper housing 120 is formed of an elastic material such as plastic, the inner wall 136 is also elastic. In certain embodiments of the present general inventive concept, a thickness (T) of the inner wall 136 may be adjusted to provide an appropriate elastic force, as illustrated in FIG. 6, by forming a through hole or slot 137 proximal to the mounting part 130. Also, in certain embodiments of the present general inventive concept, the width (W) of the mounting part 130 may be greater than the thickness of the adjustment arm 410, so that when the second housing 400 is rotated, the adjustment arm 410 can be elastically biased into one of a plurality of mounting portions 131, 132, 133, 134, and 135 within the mounting part 130. According to the current embodiment, a pair of mounting parts 130 and 130a and a pair of adjustment arms 410 and 410a are provided, but the present general inventive concept is not limited thereto. One of the plurality of mounting portions 131, 132, 133, 134 and 135 may allow the second catch portion 402 to be positioned between the first and second end portions 301 and 302 of the clutch spring 300 while the clutch spring 300 is in a relaxed state. For example, the position of the mounting portion 131 may be allow both the first catch portion 401 and the second catch portion 402 to be placed between the first and second end portions 301 and 302 of the relaxed clutch spring 300 when the adjustment arm 410 is placed in the mounting portion 131.

An assembly process of the exemplary torque limiter of FIG. 3 will now be described. It is to be understood that the operations of assembly may be performed in a different order than that described below without deviating from the spirit and intended scope of the present general inventive concept. The operations described below also define procedures to adjust the torque threshold of the torque limiter 100.

Figure 7:
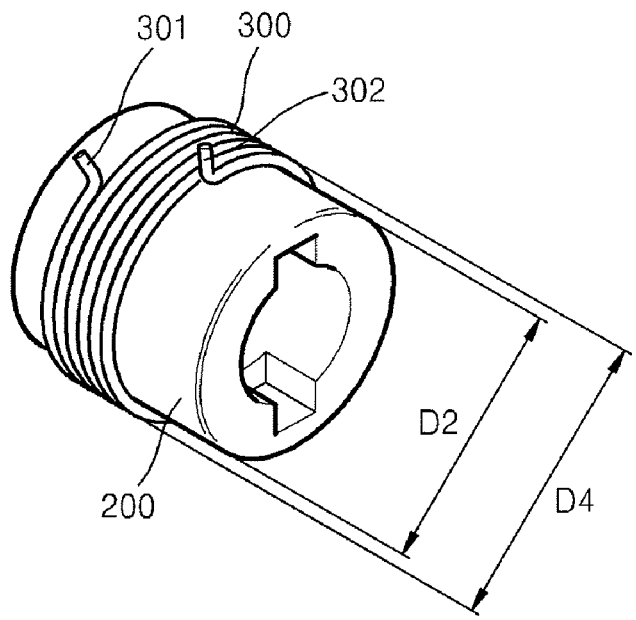
FIG. 7 is a perspective view illustrating a coupling state between a driving bushing and a clutch spring in the torque limiter of FIG. 3 according to an embodiment of the present general inventive concept.
Figure 8:
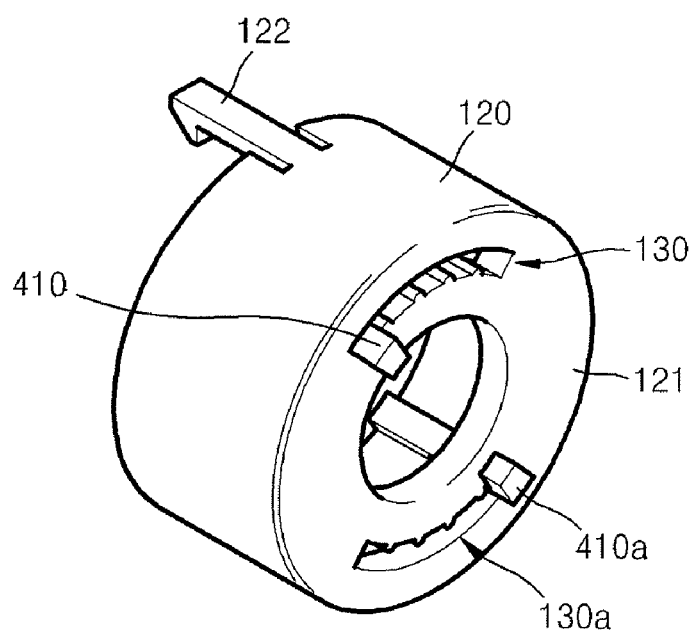
FIG. 8 is a perspective view illustrating a coupling state between a second housing and an upper housing in the torque limiter of FIG. 3 according to an embodiment of the present general inventive concept.
Figure 9:
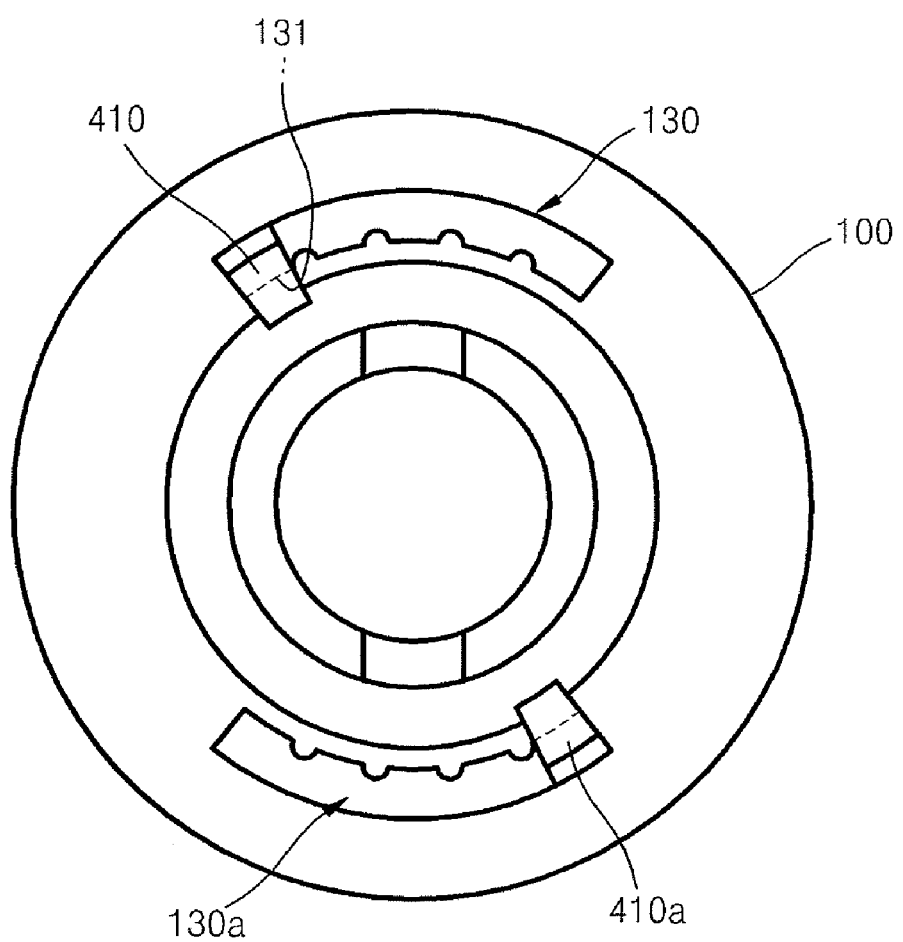
FIG. 9 is a side view of FIG. 3, according to an embodiment of the present general inventive concept.
Figure 10:
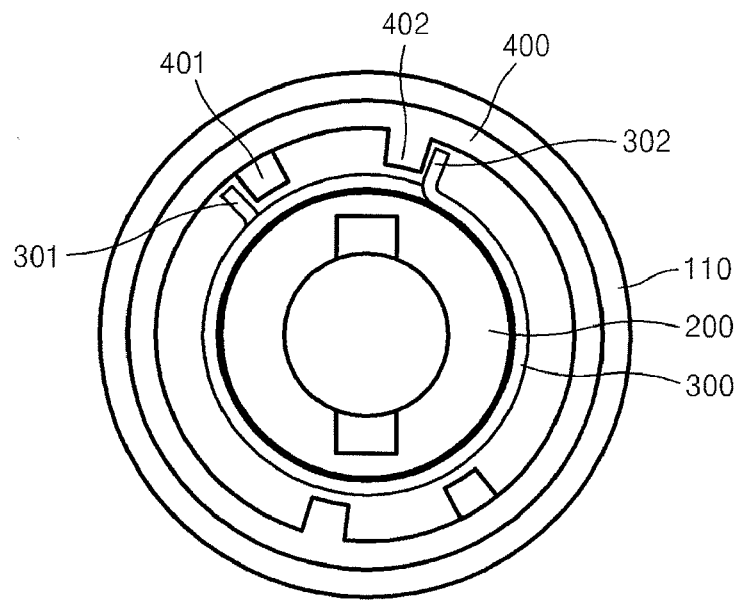
FIG. 10 illustrates how first and second end portions are related to first and second catch portions before a threshold torque is adjusted by the torque limiter of FIG. 3 according to an embodiment of the present general inventive concept.

As illustrated in FIG. 7, the clutch spring 300 is disposed on an outer circumference of the driving bushing 200. An inner diameter (D1 in FIG. 4) of the clutch spring 300 in its relaxed state is smaller than an outer diameter (D2) of the driving bushing 200. Thus, the clutch spring 300 applies a predetermined frictional force to the outer circumference of the driving bushing 200, and this frictional force serves to define a threshold torque. Thereafter, the driving bushing 200 and the clutch spring 300 may be inserted in an inner chamber 138 of the lower housing 110. The first catch portion 401 may be positioned between the first end portion 301 and the second end portion 302 of the clutch spring 300. Then, the second housing 400 may be inserted on an outer circumference of the clutch spring 300. The second catch portion 402 may be placed in the internal chamber 138 between the first end portion 301 and the second end portion 302 of the clutch spring 300. Thereafter, the upper housing 120 may be inserted in the lower housing 110, surrounding the second housing 400. The adjustment arm 410 may be inserted in one of the plurality of mounting portions 131, 132, 133, 134, and 135. To prevent the clutch spring 300 from being prematurely released when assembling the second housing 400, the adjustment arm 410 may be inserted, for example, in the mounting portion 131 at an initial assembly stage, as illustrated in FIG. 9. As an alternate method, as illustrated in FIG. 8, after the second housing 400 is mounted to the upper housing 120, the upper housing 120 may be coupled to the lower housing 110. In this case, the second housing 400 and the upper housing 120 may be coupled such that the adjustment arm 410 is inserted in the mounting portion 131. In certain instances, the second housing 400 and the upper housing 120 may be coupled together without positioning the adjustment arm 410, and before the coupled second housing 400 and upper housing 120 are coupled to the lower housing 120, the second housing 400 may be rotated, thereby placing the adjustment arm 410 in the mounting portion 131 at the selected position. The hook 122 may then be coupled to the coupling portion 112, thereby completing the assembly process of the torque limiter illustrated in FIG. 3. As illustrated in FIG. 10, when the assembly process is completed, the first and second catch portions 401 and 402 are placed between the first and second end portions 301 and 302 of the clutch spring 300, and clearances exist between the first and second catch portions 401 and 402 and the first and second end portions 301 and 302. That is, the first and second catch portions 401 and 402 are spaced apart from the first and second end portions 301 and 302, respectively.

Then, the second housing 400 may be rotated to set a threshold torque of the torque limiter to a desired level and to fully engage the first and second catch portions 401 and 402 with the first and second end portions 301 and 302. The inner diameter (D3 in FIG. 4) of the second housing 400 may be greater than the outer diameter (D4 in FIG. 7) of the clutch spring 300 inserted in the driving bushing 200, and the inner diameter (D5 in FIG. 4) of the upper housing 210 may be greater than the outer diameter (D6 in FIG. 4) of the second housing 400. When so configured, the second housing 400 can be rotated with respect to the upper housing 120. The lower housing 110 and the upper housing 120 are fixed by the hook 122 being received in the complementary coupling portion 112, and the second catch portion 402 provides the adjustment capability by being displaceable with respect to the first catch portion 401 when the second housing 400 is rotated.

Figure 11:
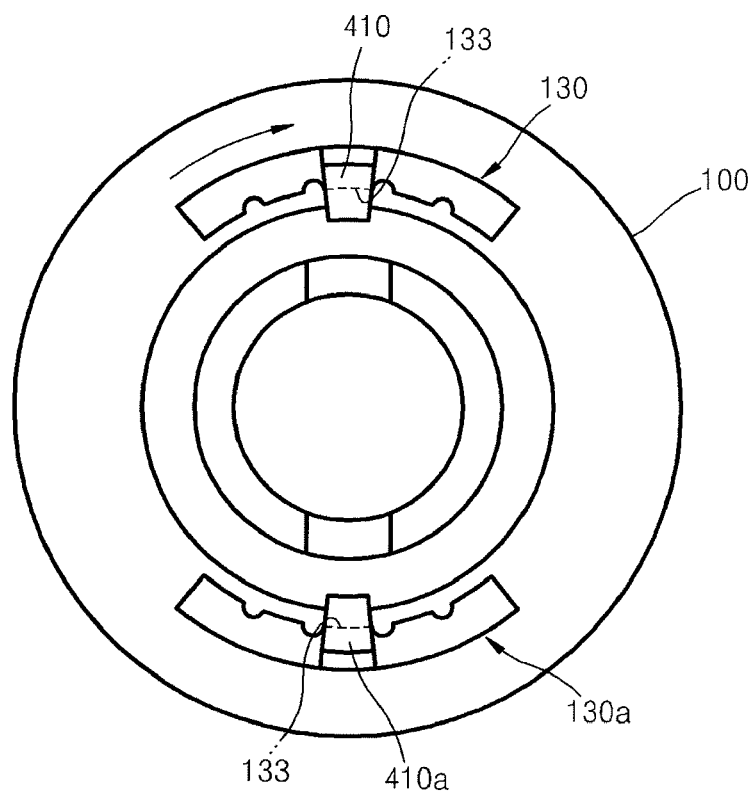
FIG. 11 illustrates a relationship between first and second end portions and first and second catch portions after a threshold torque is adjusted in the torque limiter of FIG. 3 according to an embodiment of the present general inventive concept.
Figure 12:
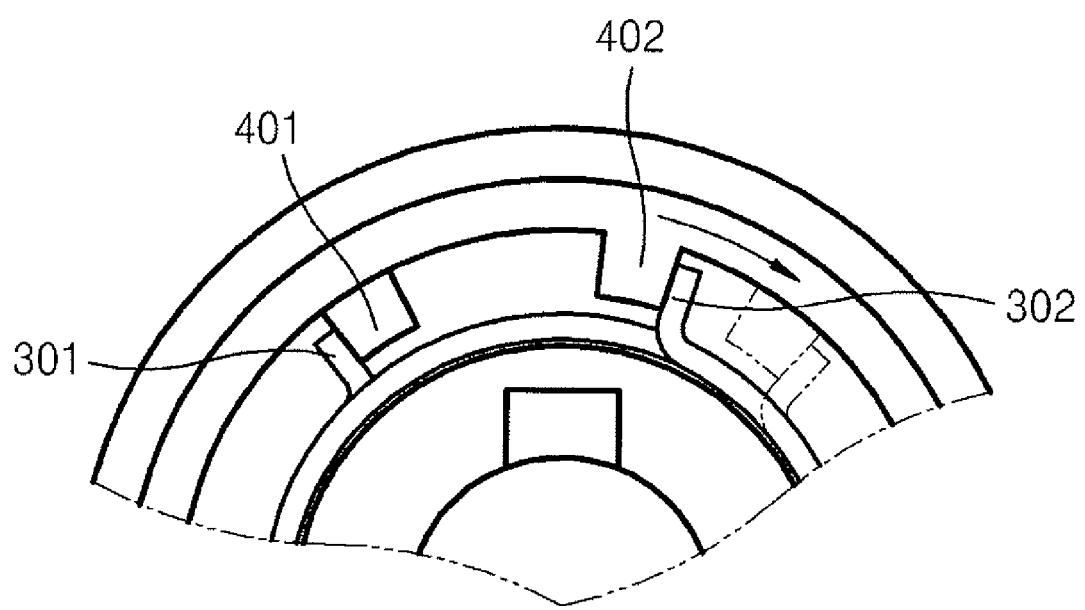
FIG. 12 illustrates an operation of the torque limiter of FIG. 3 according to an embodiment of the present general inventive concept.

For example, if the threshold torque of the torque limiter is set to a desired level by using the mounting portion 133 of the plurality of mounting portions 131, 132, 133, 134 and 135, as illustrated in FIG. 11, the second housing 400 may be rotated to place the adjustment arm 410 in the mounting portion 133. Then, as illustrated in FIG. 12, a spread distance between the first catch portion 401 and the second catch portion 402 (i.e., an angular displacement between the first and second catch portions 401 and 402 by way of the second catch portion 402 being rotated with respect to the first catch portion 401 according to the current embodiment) is changed, and thus the first and second end portions 301 and 302 of the clutch spring 300 are spread out. Thus, the frictional force between the driving bushing 200 and the clutch spring 300 is adjusted to establish the threshold torque. Also, since any clearances between the first and second catch portions 401 and 402 and the first and second end portions 301 and 302 of the clutch spring 300 are closed through the relative displacement of first and second catch portions 401 and 402, backlash does not occur when the torque limiter is operating. Further, to facilitate the rotation of the second housing 400, the adjustment arm 410 may extend outwardly beyond an end portion 121 of the upper housing 120 (see FIG. 3). In certain embodiments of the present general inventive concept, the adjustment arm 410 is inline with and extended from the second catch portion 402 to provide an indication from the outside of the housing 100 where the second end portion 302 of the clutch spring 300 is located.

In the assembly process of the torque limiter according to certain embodiments of the present general inventive concept, the first and second end portions 301 and 302 of the clutch spring 300 can be engaged with the first and second catch portions 401 and 402 simply by placing the first and second catch portions 401 and 402 between the first and second end portions 301 and 302, without having to spread the first and second end portions 301 and 302 of the clutch spring 300. After the assembly process is completed, the second housing 400 is rotated to establish the predetermined threshold torque, which makes the assembly process very simple.

In the structure described above, when the shaft 1 is rotated clockwise or counterclockwise, the housing 100 is rotated clockwise or counterclockwise, thereby driving a driven body connected to the housing 100. When the shaft 1 is rotated clockwise, the housing 100 is rotated clockwise. When a load is applied by the driven body is sufficient to impose a torque greater than the threshold torque on the housing 100 (e.g., when the housing 100 is abruptly stopped), the driving bushing 200 is rotated clockwise relative to the housing 100. Then, since the first end portion 301 of the clutch spring 300 is engaged with the first catch portion 401 and the second catch portion 402 continues its movement through friction with the driving bushing 200, an angle between the first and second end portions 302 rapidly increases, thereby lowering the frictional force of the clutch spring 300 on the driving bushing 200. Accordingly, slip occurs between the clutch spring 300 and the driving bushing 200. In this manner, the torque limiter cuts off the power transfer between the driving source and the driven body when a load greater than the threshold torque is applied. A torque less than the threshold torque can be transferred to the load as long as the threshold torque is not exceeded. If a load occurs on the driven body and thus a torque greater than the threshold torque is applied to the housing 100 when the shaft 1 is rotated counterclockwise, the second end portion 302 of the clutch spring 300 is engaged with the second catch portion 402 and the first catch portion 401 continues its movement through friction with the driving bushing 200. Consequently, an angle between the first and second end portions 301 and 302 increases, and thus slip occurs between the clutch spring 300 and the driving bushing 200. In this manner, the torque limiter according to an embodiment of the present general inventive concept is operated without backlash.

According to an embodiment of the present general inventive concept, the torque limiter is configured to allow the adjustment of a threshold torque. In the manufacturing process, dimensional tolerances of the outer diameter D2 of the driving bushing 200, and the inner diameter D1 of the clutch spring 300, and the angle between the first and second end portions 301 and 302 of the clutch spring 300 can stack up, i.e., individual components may be within tolerance, but the interface between components may be at an extreme of the design range. Consequently, even if the adjustment arm 410 is mounted in, for example, the mounting portion 133, i.e., a design position, an actual threshold torque of the torque limiter may differ from the design level through a stack-up in tolerances. In this case, according to the torque limiter of the conventional art, the driving bushing 200 or the clutch spring 300 would have to be manufactured again. However, the torque limiter according to an embodiment of the present general inventive concept can easily compensate for a threshold torque error due to manufacturing tolerances by rotating the second housing 400 in a direction that compensates the difference between the design torque threshold and the incorrect torque threshold caused by the tolerance stack up. The adjustment arm 410 can then be mounted in, for example, the mounting portion 132 or the mounting portion 134.

According to an embodiment of the present general inventive concept, the torque limiter can obtain threshold torque levels in steps by rotating the second housing 400. Accordingly, one torque limiter can fulfill the requirements of a plurality of torque applications, where each application has different threshold torque level requirements, so that the torque limiter can be used in various devices.

The assembly process of the torque limiter is very simple because the first and second catch portions are simply placed between the first and second end portions of the relaxed clutch spring during the assembly process.

Also, since a relative location of the second catch portion with respect to the first catch portion can be adjusted, a threshold torque can be easily adjusted and thus manufacturing tolerances of the threshold torque can be ameliorated.

Since the relative location of the second catch portion with respect to the first catch portion can be adjusted, one torque limiter can provide a plurality of threshold torque levels.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A torque limiter comprising:
    a driving bushing;
    a clutch spring wound around an outer circumference of the driving bushing; and
    a housing to receive a driving force via the clutch spring, wherein the housing comprises:
    a mounting part including an opening defining a plurality of predetermined positions;
    a first catch portion engaged with a first end portion of the clutch spring;
    a second catch portion engaged with a second end portion of the clutch spring, the second catch portion being moveable between the plurality of predetermined positions with respect to the first catch portion to change an angle between the first and second end portions, wherein each of the plurality of predetermined positions corresponds to a different angle between the first and second end portions; and
    a locking portion including an adjustment arm extending from the second catch portion into the opening to lock the second catch portion in any one of the plurality of predetermined positions to maintain the changed angle between the first and second end portions.

2. The torque limiter of claim 1, wherein the second catch portion is rotatable with respect to the first catch portion.

3. The torque limiter of claim 1, wherein one of the plurality of positions allows the second catch portion to be placed between the first and second end portions of the clutch spring while the clutch spring is in a relaxed state.

4. A torque limiter comprising:
a driving bushing;
a clutch spring wound around an outer circumference of the driving bushing; and
a housing receiving a driving force via the clutch spring, the housing comprising a mounting part including an opening defining a plurality of predetermined positions, a first housing, and a second housing coupled to be movable between the plurality of predetermined positions with respect to the first housing, and a locking portion including an adjustment arm extending into the opening to lock the second housing in any one of the plurality of predetermined positions,
wherein the first housing comprises a first catch portion engaged with a first end portion of the clutch spring, and the second housing comprises a second catch portion engaged with a second end portion of the clutch spring, such that an angle between the first and second end portions of the clutch spring is changed when the first and second housings are moved between the plurality of predetermined positions with respect to each other.

5. The torque limiter of claim 4, wherein the first housing further comprises a lower housing including the first catch portion, and an upper housing coupled with the lower housing, and
the second housing is coupled rotatably to the upper housing.

6. The torque limiter of claim 4, wherein one of the plurality of predetermined portions allows the second catch portion to be placed between the first and second end portions of the clutch spring.

7. A torque limiter comprising:
a drive member to receive torque about a rotational axis thereof;
a clutch member frictionally coupled to the drive member by an amount of friction proportional to a spread distance between a first end portion and a second end portion thereof; and
a housing having a mounting part including an opening defining a plurality of predetermined positions, the housing being coupled to the clutch member through a first catch portion and a second catch portion thereof respectively engaging the first end portion and the second end portion of the clutch member, the first catch portion and the second catch portion being displaceable respective one another between the plurality of predetermined positions to establish a selected spread distance between the first end portion and the second end portion of the clutch member and subsequently locked in a relative position respective one another by a locking portion including an adjustment arm extending from the second catch portion into the opening to maintain the selected spread distance between the first and second end portions.

8. The torque limiter of claim 7, wherein the housing comprises:
a first housing member having formed thereon the first catch portion; and
a second housing member having formed thereon the second catch portion.

9. The torque limiter of claim 7, wherein the opening is defined by a wall having an elasticity to be biased against the adjustment arm so as to retain the adjustment arm in a selected one of the plurality of predetermined positions.

10. The torque limiter of claim 9, wherein the adjustment arm is of a thickness to be displaceable in the opening from one of the plurality of predetermined positions to the selected one of the plurality of predetermined positions.

11. The torque limiter of claim 7, wherein the clutch member comprises a spring having the first end portion and the second end portion.

12. The torque limiter of claim 11, wherein the spring is a coil spring.

13. A torque limiter comprising:
a cylindrical drive member to receive torque about a rotational axis thereof;
a clutch member frictionally coupled to an outer periphery of the drive member by an amount of friction proportional to a spread distance between a first end portion and a second end portion thereof; and
a cylindrical housing having a longitudinal dimension parallel to the rotational axis and a radial dimension, the housing having a mounting part including an opening defining a plurality of predetermined positions and being coupled to the clutch member through a first catch portion and a second catch portion thereof respectively engaging the first end portion and the second end portion of the clutch member, the first catch portion and the second catch portion being displaceable respective one another between the plurality of predetermined positions to establish a selected spread distance between the first end portion and the second end portion of the clutch member and subsequently locked in a relative position respective one another by a locking portion including an adjustment arm extending from the second catch portion into the opening to maintain the selected spread distance between the first and second end portions.

14. The torque limiter of claim 13, wherein the housing comprises:
a first housing member having formed thereon the first catch portion; and
a second housing member contained within the first housing member and having formed thereon the second catch portion.

15. The torque limiter of claim 14, wherein the first housing member comprises:
a lower housing member having formed thereon the first catch portion; and
an upper housing member coupled with the lower housing and receiving in an interior chamber thereof the second housing member.

16. The torque limiter of claim 13, wherein the opening is substantially arc shaped and includes a plurality of mounting portions therein in which the adjustment arm is received to lock the first catch portion and the second catch portion in the relative position.

* * * * *